(12) United States Patent
Schmitt et al.

(10) Patent No.: US 7,148,974 B1
(45) Date of Patent: Dec. 12, 2006

(54) METHOD FOR TRACKING THE LOCATION OF MOBILE AGENTS USING STAND-OFF DETECTION TECHNIQUE

(75) Inventors: Randal L. Schmitt, Tijeras, NM (US); Susan Fae Ann Bender, Tijeras, NM (US); Philip J. Rodacy, Albuquerque, NM (US); Philip J. Hargis, Jr., Albuquerque, NM (US); Mark S. Johnson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 472 days.

(21) Appl. No.: 10/757,697

(22) Filed: Jan. 13, 2004

(51) Int. Cl.
*G01B 11/14* (2006.01)
(52) U.S. Cl. ..................... 356/622; 356/620
(58) Field of Classification Search .............. 356/622, 356/620, 614, 141.1; 342/54, 22, 27–28, 342/52; 250/203.1, 203.2, 559.29, 559.32, 250/559.4, 574
See application file for complete search history.

(56) References Cited

U.S. PATENT DOCUMENTS

| | | | |
|---|---|---|---|
| 3,768,908 A * | 10/1973 | Zaromb | 356/338 |
| 4,862,257 A * | 8/1989 | Ulich | 348/31 |
| 5,096,293 A | 3/1992 | Cecchi et al. | |
| 5,270,780 A | 12/1993 | Moran et al. | |
| 6,388,246 B1 | 5/2002 | Fry et al. | |
| 6,396,577 B1 * | 5/2002 | Ramstack | 356/141.1 |
| 6,518,562 B1 | 2/2003 | Cooper et al. | |
| 6,608,677 B1 | 8/2003 | Ray et al. | |

OTHER PUBLICATIONS

Sonka, M., Hlavac, V., and Boyle, R., "Image Processing, Analysis, and Machine Vision," published by Chapman and Hall (1993), Chapter 14.
Chapters 1 and 6 of "Image Sequence Analysis," edited by T. S. Huang, published by Springer Verlag (1981).
Susan F. A. Bender, et al, Tracking Honey Bees Using LIDAR (Light Detection and Ranging), Sandia National Laboratories Sand2003-0184 Printed Jan. 2003.
Joseph A. Shaw et al, "Polarization lidar measurements of honey bees in flight for locating land mines" Optics Express, 2005, vol. 13. No. 15. pp. 5853-5863.

* cited by examiner

*Primary Examiner*—Gregory J. Toatley, Jr.
*Assistant Examiner*—Roy M. Punnoose
(74) *Attorney, Agent, or Firm*—Carol I. Ashby

(57) ABSTRACT

A method for tracking the movement and position of mobile agents using light detection and ranging (LIDAR) as a stand-off optical detection technique. The positions of the agents are tracked by analyzing the time-history of a series of optical measurements made over the field of view of the optical system. This provides a (time+3-D) or (time+2-D) mapping of the location of the mobile agents. Repeated pulses of a laser beam impinge on a mobile agent, such as a bee, and are backscattered from the agent into a LIDAR detection system. Alternatively, the incident laser pulses excite fluorescence or phosphorescence from the agent, which is detected using a LIDAR system. Analysis of the spatial location of signals from the agents produced by repeated pulses generates a multidimensional map of agent location.

20 Claims, 3 Drawing Sheets

METHOD FOR TRACKING THE LOCATION OF MOBILE AGENTS USING STAND-OFF DETECTION TECHNIQUE

The United States Government has rights in this invention pursuant to Department of Energy Contract No. DE-AC04-94AL85000 with Sandia Corporation.

BACKGROUND OF THE INVENTION

This invention relates to a method for tracking the location of mobile agents using the stand-off optical technique, light detection and ranging (LIDAR), which is also called laser radar (LADAR). There are a number of apparatus patents describing LIDAR optical systems. The method of multi-dimensional mapping of the location of mobile agents using a LIDAR system is a novel aspect of this invention.

Zaromb (U.S. Pat. No. 3,768,908) reports a LIDAR remote sensing apparatus comprising a laser transmitter and a receiver in which the radiation return is spectrally analyzed, a fluorescent target at a considerable distance from said transmitter and receiver, and means for aiming said transmitter and receiver at said fluorescent target. The presence of pollutants between the LIDAR system and said target is deduced from the attenuation of the radiation return at several wavelengths or from the Raman backscatter due to specific air pollutants.

Cecchi and Pantini (U.S. Pat. No. 5,096,293) report a multichannel fluorescence lidar comprising a source for the emission of a laser beam, an optical receiving system to focus the backscattered radiation, and an optical channels separator and means for processing the detected signals. The device comprises means for forming the ratio, two by two, of the signals originating from the optical channels separator and means for making the comparison between the values of the ratios and a series of values stored in an archive or a data base.

Moran et al. (U.S. Pat. No. 5,270,780) report a LIDAR system using dual detectors to provide three-dimensional imaging of underwater objects (or other objects hidden by a partially transmissive medium). One of the detectors is a low resolution, high bandwidth detector. The other is a high resolution, narrow bandwidth detector. An initial laser pulse is transmitted to known x-y coordinates of a target area. The photo signals returned from the target area from this initial pulse are directed to the low resolution, high bandwidth detector, where a preliminary determination as to the location (depth, or z coordinate) of an object in the target area is made based on the time-of-receipt of the return photo signal. A second laser pulse is then transmitted to the target area and the return photo signals from such second laser pulse are directed to the high resolution, narrow bandwidth detector. This high resolution detector is gated on at a time so that only photo signals returned from a narrow "slice" of the target area (corresponding to the previously detected depth of the object) are received. An image of the detected object is then reconstructed from the signals generated by the high resolution detector. In a preferred embodiment, the two detectors are housed in a single digicon tube, with magnetic deflection being used to steer the beam to the appropriate detector.

Fry (U.S. Pat. No. 6,388,246) reports a system for detecting an underwater object including an optical signal generator operable to generate and transmit an optical signal into the water. The system also includes an absorption cell operable to receive the optical signal reflected from the water and absorb an unshifted frequency component of the reflected optical signal. The system further includes a detector operable to receive a shifted frequency component of the optical signal from the absorption cell and detect the object using the shifted frequency component of the optical signal. Displacement of the water by the object causes an absence of a portion of the shifted frequency component of the optical signal.

Cooper and Vujkovic (U.S. Pat. No. 6,518,562) report a method and apparatus for the mobile and remote detection of a gas, such as methane, in the atmosphere. The apparatus includes a tunable-diode-laser (TDL)-based Light Detection and Ranging (LIDAR) driven at carrier frequency lying within the absorption line of the gas. The apparatus also drives the TDL with a modulation frequency to generate upper and lower sidebands in the output of the TDL and with a low ramp frequency to sweep the output of the TDL across twice the width of the pressure-broadened absorption line of the gas, preferably the first overtone absorption line in the case of methane detection. Suitable power for remote detection through use of the TDL is provided by a master oscillator/fiber amplifier transmitter has no moving or adjustable parts at all. An all-solid-state monolithic and integrated amplifier is achieved, which leads to a compact and virtually maintenance-free LIDAR system. The remote detection apparatus includes reference and calibration cells or chambers, and includes a light collector and detectors to detect the quantity and modulation of the light that passes the reference or calibration cells and that is received by the apparatus after reflection back toward the apparatus from an uncooperative target. The apparatus further includes a signal processor that applies a derivative spectroscopy technique, such as frequency modulation spectroscopy or wavelength modulation spectroscopy, to determine the presence of the gas in the atmosphere.

Ray and Sedlacek. (U.S. Pat. No. 6,608,677) report a method and apparatus for remote, stand-off, and high efficiency spectroscopic detection of biological and chemical substances. The apparatus including an optical beam transmitter which transmits a beam having an axis of transmission to a target, the beam comprising at least a laser emission. An optical detector having an optical detection path to the target is provided for gathering optical information. The optical detection path has an axis of optical detection. A beam alignment device fixes the transmitter proximal to the detector and directs the beam to the target along the optical detection path such that the axis of transmission is within the optical detection path. Optical information gathered by the optical detector is analyzed by an analyzer which is operatively connected to the detector.

An application of LIDAR technology to tracking the location of honey bees is described in "Tracking Honey Bees Using LIDAR (Light Detection and Ranging) Technology, S. Bender, P. Rodacy, R. L. Schmitt, P. J. Hargis, Jr., M. S. Johnson, J. R. Klarkowski, and G. I. Magee, SAND Report SAND 2003-0184, (Sandia National Laboratories, Albuquerque, N. Mex., 2003).

DETAILED DESCRIPTION OF THE INVENTION

Figure 1:
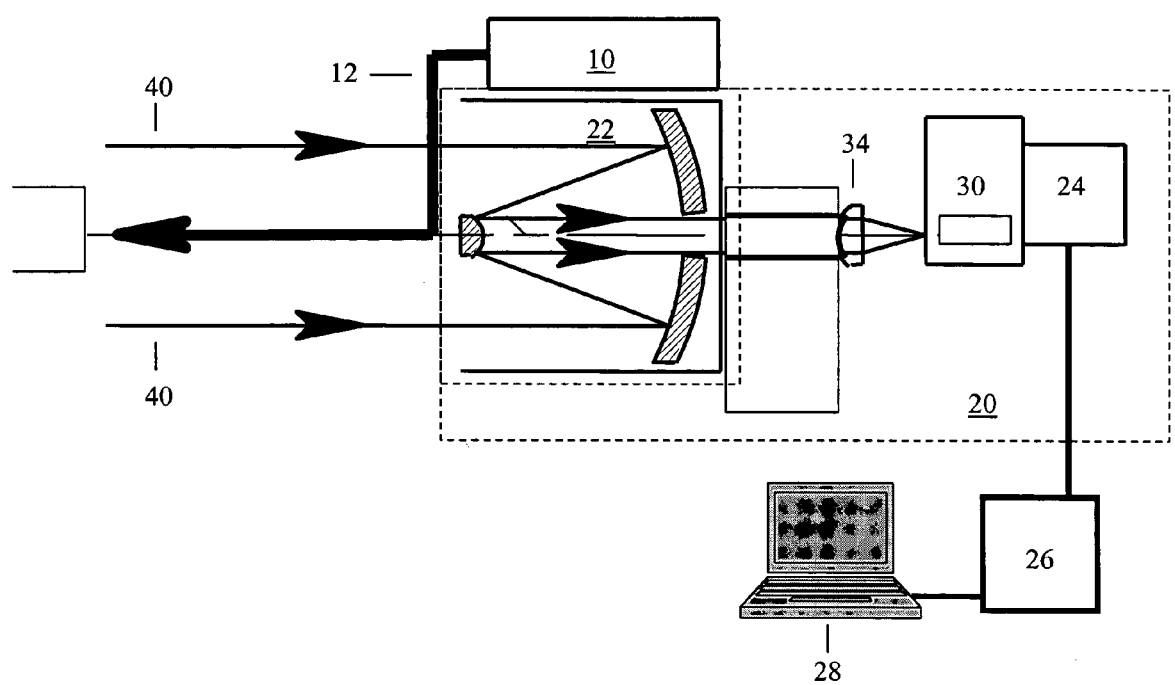
FIG. 1 illustrates a scanning LIDAR system.

This invention is a method for tracking the movement and position of mobile agents using stand-off optical detection. This method can be used for continuous monitoring and mapping of the mobile agents. The positions of the agents are tracked by analyzing the time-history of a series of optical measurements made over the field of view of the optical system. The four-dimensional (time+3-dimensional space) mapping of the location of mobile agents within a specified field of view of the optical detection system has utility in a wide range of applications. In some applications of this method, the location of mobile agents in three dimensions (time+2-dimensional space) is sufficient for the intended application. When it is desired for the agents to perform a particular function within the field of view, for example, the pollination of plants by bees, knowledge of where the agents traveled and how long they remained in a particular area provides a basis for determining whether they have accomplished their intended function in that area. When it is desired for the agents to indicate the location of a particular attractant or repellent within the field of view, for example, detection of explosive residues emanating from land mines using bees trained to be attracted to indicator chemical species, knowledge of the areas where the agents congregate provides a basis for locating the source of the attractant. Similarly, the consistent absence or minimal presence of the mobile agents in a particular region of the field of view provides evidence for the location of a repellant or lethal local environment.

The mobile agents whose movements are characterized using embodiments of this invention can be living organisms or non-living, man-made units. The method of using an optical detection system to generate the multi-dimensional (3-D or 4-D) map of agent location makes the embodiments of this invention suitable for use with agents that are operative in air or water environments where adequate transmission of both the incident light from the optical transmitter and the interacted light returning from the mobile agent to the optical detector can occur. Interacted light can be light that has been elastically scattered from the mobile agent or light that has inelastically scattered from the agent. Interacted light also can be light that results from excitation of either a portion of the agent or of a material attached to the agent; this type if interacted light includes both fluorescent and phosphorescent emission. Many animal species are highly suitable for such applications as mobile agents. Some of the taxonomic classes of animals that are especially suitable include, but are not restricted to, insecta (for example, insects), crustacea (for example, lobsters, crayfish), arachnida (for example, spiders), osteichthyes (for example, fish), chondrichthyes (for example, sharks and rays), aves (for example, birds), and mammalia (for example, mammals including humans.) One taxonomic order that is particularly well suited as a source of mobile agents is *hymenoptera*(for example, bees, wasps, and ants.) One embodiment of this invention uses honey bees, as partially described in S. Bender, P. Rodacy, R. L. Schmitt, P. J. Hargis, Jr., M. S. Johnson, J. R. Klarkowski, and G. I. Magee, SAND Report SAND 2003-0184, (Sandia National Laboratories, Albuquerque, N. Mex., 2003) and incorporated herein by reference.

The mobile agents characterized by the many embodiments of this invention can display behavioral characteristics that determine which embodiment of this invention is better suited to providing the desired multi-dimensional (3-D or 4-D) map. Some agents remain quite close to the ground as they perform their function while others spend more time positioned away from the ground surface in either air or water. Variations on the embodiments described below can provide the required information for each type of behavior.

LIDAR (LIght Detection And Ranging) is an optical remote sensing technique that uses the return of interacted light from an object to detect the presence and location of an object in the LIDAR field of view. For the purposes of the many embodiments of this invention, interacted light can be light at the original transmitted wavelength that has reflected or elastically scattered from an object. Interacted light can also be light at a different wavelength from the original transmitted wavelength that results from electronic, vibrational, or rotational excitation of the object or material on its surface. A LIDAR system comprises a laser light source and a detection system that receives and indicates the presence of light that has interacted with an object. Interaction of the light transmitted from the LIDAR laser source can occur with molecules, aerosols, dust particles, and larger objects. The mobile agents characterized by the embodiments of the invention comprise larger objects for LIDAR detection. In the embodiments of this invention, laser light pulses are transmitted at a first known time through the area where the mobile agents are known or suspected to be present or to have been present. A pulse of interacted light is received with the receiver optical system at one or more later known times.

In some embodiments, a fraction of the laser light that strikes the agents interacts with the agents and is elastically scattered back to a detector system that is collocated with the laser. The time at which the interacted light reaches the detection system relative to the time of the initial laser pulse is a function of the distance between the detection system and the agent scattering the light. By regulated or continuous scanning over a specified space for a specified time period, a 3-D or 4-D map can be obtained.

In other embodiments, the laser light that strikes the agents produces electronic excitation of the surface or near-surface material of the agent or of a material that is adherent to the surface of the agent. The material thus excited then emits light at a longer wavelength (lower energy) than the exciting laser wavelength. This fluorescent or phosphorescent light propagates toward a detector system that is collocated with the laser. The time between the outgoing pulse and the returning signal is used to measure the distance between the LIDAR system and the agent. Due to the change in wavelength, light resulting from fluorescence or phosphorescence emanating from the agent can more readily be distinguished from background than the light that is elastically backscattered from the object without a wavelength shift.

To obtain information about the changes in location of a mobile agent with time, light is repeatedly pulsed, interacted with the agent, and collected by the detection system. When an agent moves, the time at which its interacted light is received by the detection system will change for successive pulses. The time dependence of this signal is tracked by comparing signals generated by successive pulses; the change in location of the agent with time can thus be determined and mapped.

For the detection of either elastically backscattered or fluorescent light, two alternative LIDAR approaches can be used in the embodiments of this invention. These can be described as "scanning" and "staring" LIDAR. Scanning LIDAR employs a collimated beam that is in an uninterrupted line-of-sight relationship with the mobile agents. This enables the transmitted beam to interact with an agent and also enables the interacted light to return to the receiver system. The laser transmitter in a LIDAR configuration can be positioned higher, lower, or at approximately the same elevation above the ground as the agents. When the scanning LIDAR transmitter is lower or at approximately the same elevation as the agent and the ground surface displays varying topology, the scanning LIDAR detection method can experience difficulty accessing the agent when it remains at an elevation above the ground that permits the interposition of light-barrier objects, for example, shrubs, large rocks, and tall grass. For such conditions, staring LIDAR, which employs a diverging laser beam that is positioned at an elevation greater than the agent, will generally perform better for achieving multi-dimensional (3-D or 4-D mapping with this method. For many staring LIDAR embodiments and also for some scanning LIDAR embodiments, data analysis methods that rely on change detection to map the movement of agents within the LIDAR system field of view are advantageous.

In scanning LIDAR, the laser beam is scanned back and forth over a field of view and the returning interacted light intensity is recorded as a function of time relative to the initial transmitted laser pulse and LIDAR beam-pointing coordinate. From these data, the position of the object from which the interacted light came can be determined. Compilation and comparison of the data from repeated pulses produces the (time+3D space) mapping of the location of the object.

An optical system for implementing the scanning LIDAR embodiments of this invention that is illustrated in FIG. 1 comprises a) a laser transmitter (10) that emits a short pulse of light (12) to illuminate a narrow field of view, and b) a receiver optical system (20).

a) The laser transmitter for scanning LIDAR: The laser transmitter (10) emits a short pulse of light (12) (typically on the order of 10 nanoseconds or less, but the pulse length will depend on the type of laser being employed) to illuminate a narrow field of view (usually less than 1 mRad divergence). The types of pulsed lasers especially suitable for scanning LIDAR typically have a light pulse length of 10 nsec or less. Pulses longer than 10 nsec can be used but shorter pulse lengths are advantageous for improving the range resolution, $\Delta R$, since the resolution is given by $\Delta R = c\Delta t/2$, where c is the speed of light and $\Delta t$ is the time interval of the measurement. The minimum time interval of the measurement is determined by the sum of the laser pulse length and the temporal resolution of the photodetection system. A laser pulse length of 10 ns with a 100 MHz digitizer with 10 ns sample spacing yields a 1.5-m range resolution. The x-y (lateral) resolution (or angular resolution) is determined by the divergence of the laser beam and the distance from the LIDAR system. When the mobile agents are honey bees, a detection limit of approximately 10 bees per range bin has been achieved with an unoptimized optical system using a LIDAR beam with a cross-sectional area of about 0.5 m×0.5 m at 1 km distance with a range resolution of 1.5 m in length. A limit of 1 bee-sized object per range bin is possible if the optical system is optimized for backscattering detection.

Depending on the specific mobile agent employed, the LIDAR laser can be selected from lasers operating over the entire range of wavelengths for which suitable optical detectors are available. These wavelengths extend from the ultraviolet to the near-infrared regions of the spectrum. For elastic backscattering LIDAR, the laser wavelength can be any wavelength that transmits well in the atmosphere or in water. These include but are not restricted to 1064-nm, 532-nm, and 355-nm light commonly available from Nd:YAG lasers and eye-safe wavelengths longer than 1.5 µm. Light of any wavelength from a laser capable of providing sufficiently narrow effective beam divergence to provide the necessary resolution and sufficiently short pulse lengths can be used. Some but not all of the lasers suitable for this method are Nd:YAG, Nd:YLF, Nd:YVO$_4$, Nd:LSB, Nd:Glass, Nd:NiNbO$_3$, Ho:YAG, Ho:YLF, Er:YAG, Er:Glass, and ruby. In addition to the fundamental and higher harmonic wavelengths directly available from these lasers, they can be used in combination with optical parametric oscillators (OPOs), Raman shifters, laser-pumped tunable lasers such as Ti:Al$_2$O$_3$, or dye lasers to provide laser pulses at other wavelengths across the ultraviolet-to-infrared range.

For aerosols and gas molecules, there is a significantly higher scattering cross section for shorter-wavelength light. However, the mobile agents characterized by the embodiments of this invention are much larger than either Rayleigh or Mie scattering length scales so their scattering cross sections will be proportional to their area and albedo (reflectance.) Consequently, when it is desirable to reduce background signal contributions from aerosols and gas molecules, use of a wavelength of light where the reflectivity of a particular type of mobile agent is near maximum can yield a large return signal for a given laser energy. When reduction or elimination of background signal due to aerosols is desirable, use of longer wavelengths may be advantageous because the Rayleigh scattering cross section is greatly reduced as wavelength increases since the Rayleigh cross section is proportional to $1/(wavelength)^4$.

When the position of the mobile agent is to be sensed by the natural fluorescence of the mobile agent or of a fluorescent material applied to the mobile agent (for example, a tag or dye), the wavelength of the laser can be chosen to effectively excite fluorescent emission from the agent or tag. When the embodiments of this invention are operated in this mode, background signal from the elastic backscattering of the incident laser can be readily excluded by operating the detection system with an optical bandpass filter tuned to the fluorescence wavelength band while providing rejection of the incident laser wavelength. Background rejection is improved when the fluorescent emission spectrum does not overlap with the incident laser wavelength. This condition simplifies the hardware employed in our method because one can then use a detector without gating to reduce or exclude background signal.

Regardless of the wavelength or specific laser employed, a high-quality, low-divergence laser beam is desirable to avoid unwanted background scattering off objects adjacent to the mobile agents since this can degrade the ability to discriminate the signal from the mobile agents from the signal from a near-by object.

b) The receiver optical system for scanning LIDAR: Receiver optics collect the light (40) that has interacted with the mobile agents. In FIG. 1, an embodiment of the method using a receiver optical telescope (22) is illustrated. The field of view of the receiver telescope should be slightly larger than the divergence of the laser beam to allow good optical overlap in the presence of laser-beam-pointing jitter and other optical system misalignments that can develop either with the change of temperature or over time. A field of view for the telescope on the order of 1.25 times larger than the divergence of the laser beam works well, but larger values can also be used. The orientation of the telescope with respect to the receiver telescope can be either biaxial or coaxial, which usually provides better performance. A biaxial system is simpler to design and build, but the overlap between the transmitted and received beams is a complex function of range, which complicates mapping of the motion of the mobile agents. A coaxial system provides the best overlap of the transmitted and received beams over all ranges, which simplifies the mapping analysis. However, either type can be used in this method.

The light collected by the receiver telescope is focused by one or more lenses (34) onto a high-speed photodetector (24) (see FIG. 1). This photodetection system measures the intensity of the pulse of interacted light in a manner suitable for electronic data storage. This detector can have gain, such as a photomultiplior tube (PMT) or avalance photodiode (APD). The output of the high-speed photodetector is input to a fast digitizer (26) to record the intensity of the interacted light as a function of time. The overall bandwidth of the photodetector/digitizer electronics determines the range resolution of the measurement. With a bandwidth of 100 MHz (10-ns temporal resolution), the range resolution of the scanning LIDAR measurement is 1.5 m. The output of the digitizer is input to a computer (28).

Figure 2:
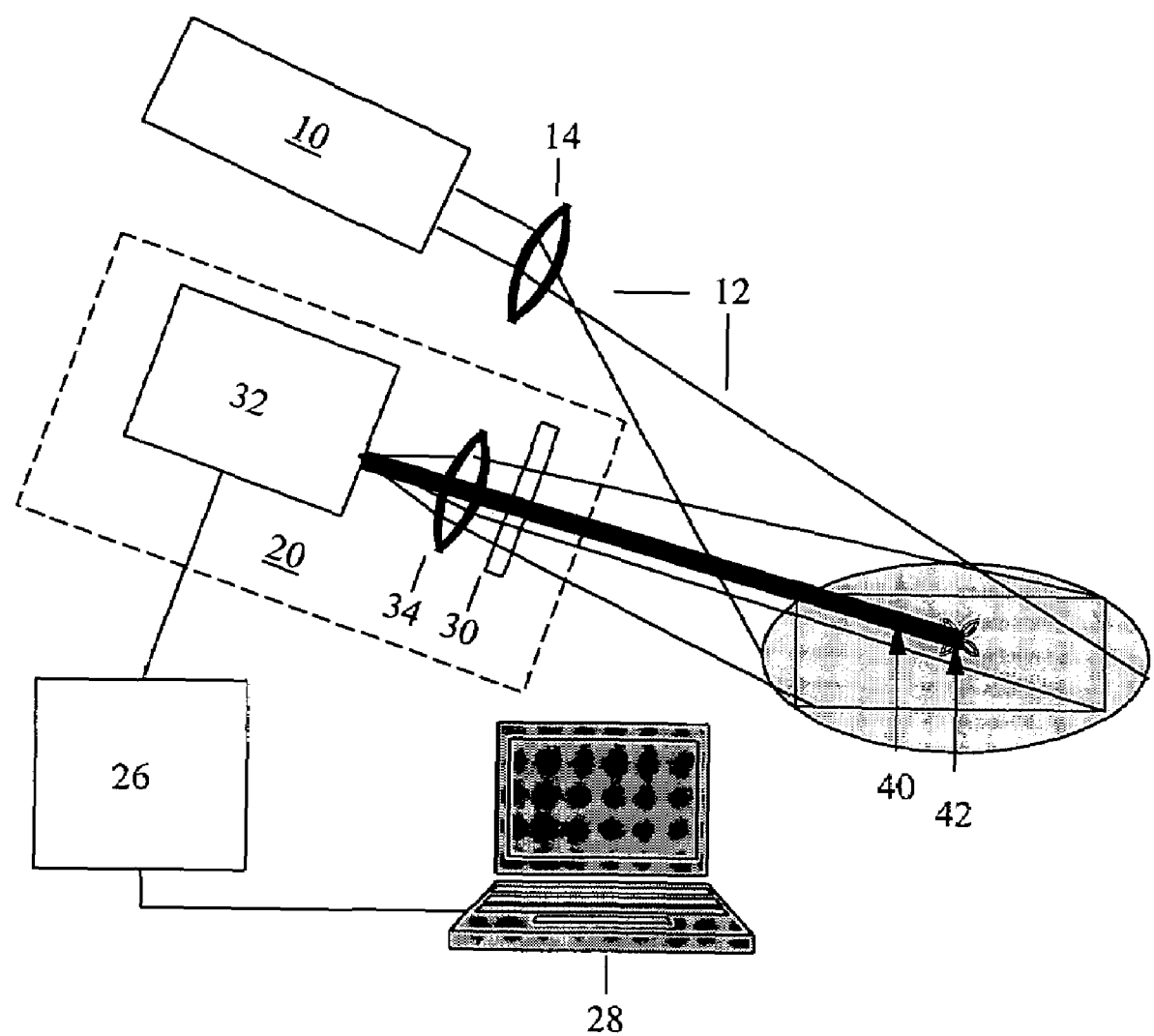
FIG. 2 illustrates a staring LIDAR system.

A single high-speed photodetector/digitizer can be used for either elastically backscattered light or for fluorescent light. A second high-speed photodetector/digitizer combination can be used to allow detection of the interacted light at two wavelengths, for example, if one wants to measure both elastically backscattered and fluorescent light or two fluorescent light signals at different wavelengths. For simplicity, only one is illustrated in FIGS. 1 and 2, but a multiplicity can be used in the embodiments of this invention.

An optical bandpass filter or monochromator (30) is needed in front of the photodetector to transmit the backscattered laser or fluorescent signal while blocking background light such as solar radiation. The elastically-scattered-light detector needs a bandpass filter or monochromator with a center wavelength the same as the transmitted laser wavelength and a bandwidth of not more than about 20 nm; a narrower bandwidth (for example, 1 nm) improves performance. The fluorescent-light detector needs a bandpass filter or monochromator with a center wavelength corresponding preferably to the emission peak of the fluorescence spectrum and a bandwidth sufficient to include a significant fraction of the emission band (typically 30 nm will work well.)

In scanning LIDAR embodiments of this invention, the image of the region to be mapped with respect to mobile agent activity is generated by raster-scanning the laser beam in a pattern selected to provide coverage of the desired mapping region. For many applications, such as tracking flying mobile agents, the laser beam is scanned through a plurality of pointing directions in a horizontal plane roughly parallel to the ground. Analysis of the LIDAR data produces an image or map of the mobile agents with their position in range from the LIDAR and azimuthal angle (R,θ). A series of these images are compared to identify and map the time-dependent location of the mobile agent within that region. An angle-position encoder is used to measure where the LIDAR system is pointing during any given measurement. Use of a high-resolution position encoder, therefore, improves the spatial resolution of scanning-LIDAR embodiments of this invention.

Figure 3:
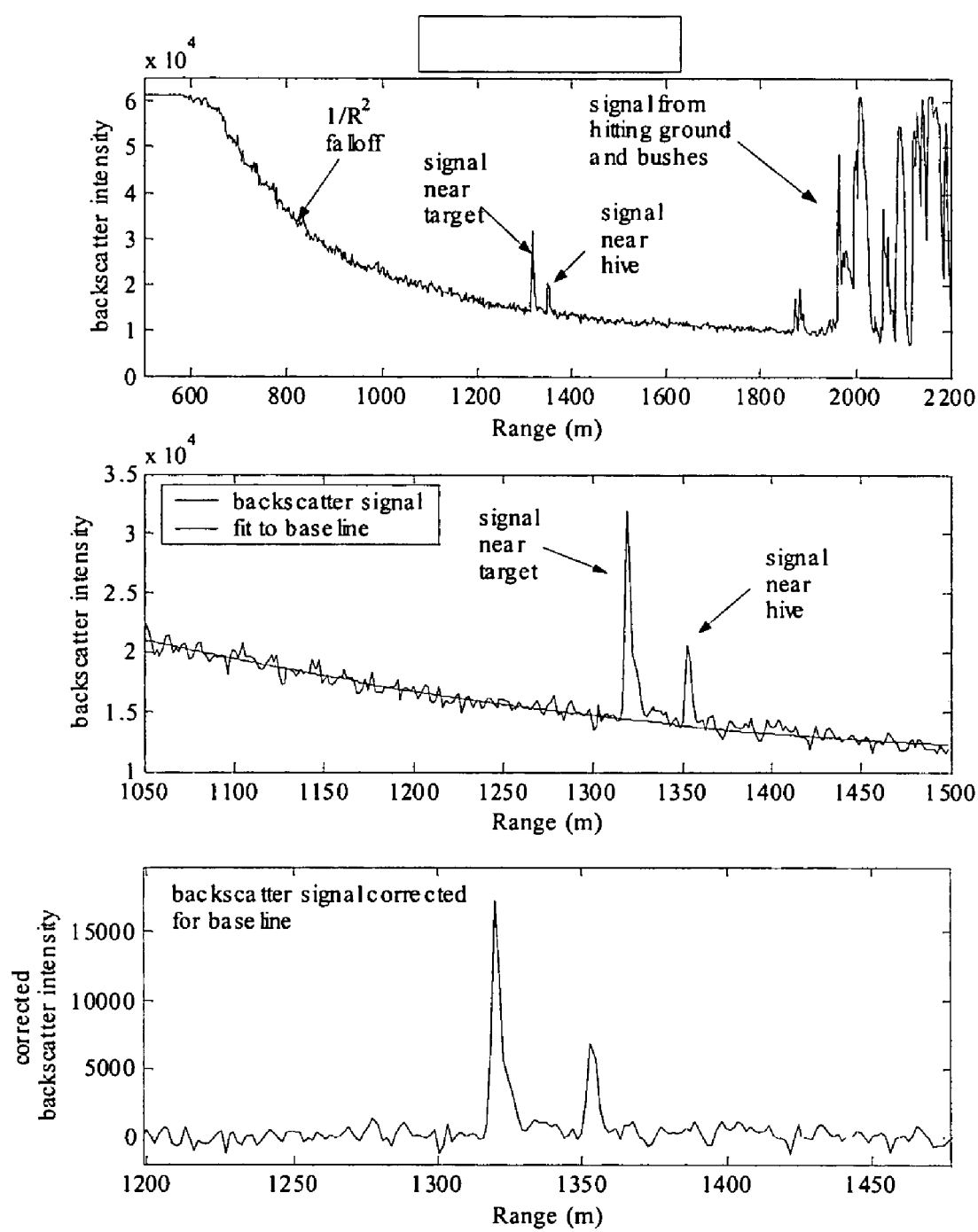
FIG. 3 illustrates raw and base-line corrected data from scanning LIDAR.

The raw data from a scanning LIDAR system consists of a series of return signals of interacted light, one for each laser shot. The data from one pointing direction where the mobile agents are honey bees is illustrated in FIG. 3. Each return signal contains the backscattered, fluorescent, or phosphorescent light intensity as a function of time, which correlates with range. First, each return signal must be processed to locate light backscattering, fluorescence, or phosphorescence in excess of the ambient clear air levels to identify scattering or light emission from large particles, clouds of particles or other objects in the field of view. Next, the location of these backscattering, fluorescing, or phosphorescing events must be electronically stored as a portion of an image or map. Finally, these images produced during a series of subsequent scans must be compared to determine which backscattering, fluorescing, or phosphorescing events are due to the mobile agents and which are due to fixed objects in the field of view.

The first step in data processing is to identify backscattering, fluorescing, or phosphorescing events from the raw data waveforms. One technique is to mathematically fit each measured waveform to an ideal "clear air" waveform shape and compute the residual (that is, the difference between the measured and the ideal forms). Peaks in the residual waveform will be present wherever the measured signal was above clear-air signal levels. In order to differentiate peaks due to real scattering, fluorescing, or phosphorescing objects from noise peaks, one must choose a threshold value for comparison that lies above the system noise level. Peaks which are above the threshold value will be considered to originate from scattering, fluorescing, or phosphorescing objects (either mobile agents or other objects in the field of view). The system noise level can be measured by collecting and processing signal waveforms from clear air. The system noise level is actually range dependent, and, as a result, the threshold will be range dependent.

Once the signals as initially received by the detection system have been processed to identify scattering, fluorescing, and phosphorescing objects, an image or map can be constructed that shows the location and size of all the scattering objects in the scanned field of view. The return signal for each laser pulse yields information for one line of sight. Using the range information from the backscattering, fluorescence, and phosphorescence signals and angular information from the position encoder from the LIDAR pointing system, one can produce a map of the location of the backscattering, fluorescence, and phosphorescence events for each scan of the field of interest.

There are several methods of differentiating the mobile agents from other objects in the field of interest. First, the fixed objects (such as trees, buildings, and the like) can be identified and mapped with scans conducted with no mobile agents in the field of interest. Then, on subsequent scans, scattering, fluorescing, and phosphorescing objects found at the location of the fixed objects can be ignored. If it is not possible to collect such a fixed object map, (for example, in a case where the region of interest is not free of mobile agent), one can construct an algorithm to compare a series of images and note changes in the positions of scattering objects. If an object is repeatedly found at the same location, it would be tagged as a fixed object and not considered to be a mobile agent. The algorithm would produce a series of images that show the location of objects that move.

The optical system for staring LIDAR comprises a) a laser transmitter (10) that emits a short pulse of light to illuminate a wide field of view, and b) a receiver optical system (20).

a) The laser transmitter for staring LIDAR: The laser transmitter (10) emits a short pulse of light (12) (typically on the order of a few nanoseconds (often 10 ns or less) to illuminate a wide field of view (on the order of 10 degrees by 10 degrees.) The illuminated field of view can be of any shape and will be determined by the beam shape of the particular laser employed. Laser-beam-shaping optics (14) can be used to form the laser beam into the optimal format for a particular application and to provide more uniform illumination of the field of view.

b) The receiver optical system for staring LIDAR: The receiver system (20) comprises a gated, intensified CCD (ICCD) camera (32) and lens system (34) that records an image of the field of view illuminated by the pulsed laser. This photodetection system measures the intensity of the pulse of interacted light in a manner suitable for electronic data storage. Total coincidence of the illuminated field of view and the receiver system field of view is not required. Other means for recording an image of the field of view can be used. Some currently available means include but are not restricted to charge-coupled-device (CCD) arrays, intensified charge-coupled-device (ICCD) arrays, charge-injection-device (CID) arrays, and infrared (IR) focal plane arrays. An appropriate choice for the image-recording means is determined by factors including the wavelength of light being employed and the temporal resolution of the image-recording device. The image-recording means provides the image signal to a computer by means of digitizer interface electronics (26). Synchronization with the laser pulse and proper electronic time gating of the ICCD can produce an image of interacted light (40) that will consist only of the fluorescence or phosphorescence from the mobile agents (42). For fluorescence or phosphorescence detection, it is desirable that the electronic gate of the ICCD is active, i.e., light sensitive, only AFTER the laser pulse has been emitted and the elastically scattered light has returned to the imaging system. This delay is chosen to eliminate the elastically scattered light from the image. The time gate width of the ICCD is selected to be several times the fluorescence or phosphorescence lifetime of the emitting material of the mobile agent. Many common dyes with nanosecond-scale fluorescence lifetimes are not optimally suited to this approach when the mobile agents are located remotely. The fluorescence lifetime should be longer than the round-trip time-of-flight of the elastically scattered light. For an agent at a distance of 150 m, this time is of the order of 1 µs. Phosphorescent materials with such longer lifetimes can be employed in this embodiment. This ensures that most of the phosphorescent emission from the mobile agent is captured by the imaging system but background light, such as solar radiation, is minimized.

For shorter-lived fluorescent emissions, useful measurements can be made by inclusion of an optical band pass filter in the imaging system that transmits the fluorescent light while blocking the background light, including the elastically scattered laser light. A bandpass filter or with a center wavelength corresponding preferably to the emission peak of the fluorescence spectrum and a bandwidth sufficient to include a significant fraction of the emission band (typically 30 nm) works well.

Staring LIDAR need not require raster-scanning to generate an image of the region to be mapped for mobile agent activity, depending on the size of that region relative to the staring LIDAR field of view. Scanning will not be required if the mapping region is no larger than the relatively broad LIDAR field of view, which results from the greater beam divergence compared to scanning LIDAR. Coverage of a wider field of view than that determined by the inherent divergence of the laser in staring LIDAR can be accomplished by varying the beam pointing of the staring LIDAR system.

The data processing in a staring LIDAR system described above is somewhat simpler than for the scanning LIDAR since the output of the detection system is already a two-dimensional image of the fluorescing, or phosphorescing objects. First, a thresholding operation is performed on each image to ensure that the image contains only data from fluorescing and phosphorescing objects. The staring lidar imaging system will have some noise, including background optical noise that may leak through the bandpass filter. The threshold would be set based on the measured noise level of the images without fluorescing or phosphorescing objects. Next, an algorithm (similar to the change detection algorithm described for the scanning system) would compare a series images and tag objects that repeatedly appear at the same location in each image. Then these fixed objects can be ignored for subsequent data processing.

Data processing techniques for detecting and locating a target object from a plurality of two-dimensional images are already known in the art. Two such examples are described in Ulich and Montgomery, U.S. Pat. No. 5,267,329, and Corwin et al, U.S. Pat. No. 5,233,541, both incorporated herein by reference. The following book chapters are also incorporated herein by reference: Chapter 14 of "Image Processing, Analysis, and Machine Vision," by Milan Sonka, Vacklav Hlavac, and Roger Boyle, published by Chapman and Hall, (1993) and Chapters 1 and 6 of "Image Sequence Analysis," Edited by T. S. Huang, published by Springer Verlag (1981).

A number of different phenomena contribute to the light signal received at the detector system following interaction of the transmitted laser light with objects within the LIDAR field of view. The multi-dimensional (3-D or 4-D) mapping of the location of the mobile agents depends on proper data analysis to extract the mobile-agent-derived signal from additional signals arriving simultaneously or nearly simultaneously at the detector. Change-detection algorithms are applied to the comparison of the sequentially arriving optical data sets to provide the multi-dimensional (3-D or 4-D) map of the mobile agent's location.

For scanning embodiments operating in the backscattering mode, the signal attributable to the mobile agents at the transmitted laser wavelength must be extracted from a background comprising a $1/(\text{range})^2$ fall-off in intensity for a well-aligned optical system with minimal or known optical attenuation by the ambient fluid (atmosphere or water) at the LIDAR wavelengths. This smooth, monotonically decreasing background can be numerically removed from the optical signal data set from each laser pulse to isolate the light signal originating from interaction with the mobile agents and other objects in the LIDAR field of view. Such removal can be helpful but is not always required with change-detection algorithms. These other objects can be fixed or moving during the timeframe of the LIDAR measurements. Fixed objects will provide a characteristic signal that can be, but need not be, numerically removed prior to further data analysis. Signals originating from scattering at fixed objects can be numerically removed from subsequent optical data sets, analogous to the removal of the $1/(\text{range})^2$ background signal. The signal strength and duration can be used to determine the relative size (areal cross section) of the objects in the field of view. The mobile agents employed in the embodiments of this invention will be of a known, characteristic size. Consequently, the backscattered signals originating from mobile agents will be characterized by a minimum signal strength and lateral extent. Analysis of incoming data to identify objects of insufficient size to be the mobile agent and extraction of their contributions can be performed to further simplify identification of the portion of the signal originating at the mobile agent. Under environmental conditions where the mobile agents tend to congregate, clustering or swarming of the agents can produce the appearance of seemingly larger objects.

There are a wide variety of change-detection algorithms available to identify differences between sequential data sets. Change-detection analysis of the sequence of LIDAR data sets is used to identify and map the motion of the mobile agents especially in the presence of a background of moving objects, for example, the movement of portions of plants in the presence of wind. Change-detection analysis is also useful to distinguish between a fluorescently tagged mobile agent and any residue of the fluorescent tag that might remain behind on a surface within the LIDAR field of view with which the mobile agent has been in contact. The selection of an appropriate change-detection algorithm for analysis of the LIDAR data sets to define the motion of the mobile agents is within the skill of those accustomed to performing stand-off spectroscopy.

This method can be affected by laser-beam-pointing jitter, atmospheric beam steering, and movement unrelated to the agent being monitored. During usage of the embodiments of this invention, information regarding these effects can be obtained and knowledge about their degree of contribution to the images can be used to guide the interpretation of the imaging data.

One embodiment of this invention employed a scanning LIDAR with a narrow field of view and recorded the elastic backscatter signal as a function of time to locate the mobile agents (bees, in this case) in time and space. The laser transmitter consisted of a flashlamp-pumped actively Q-switched Nd:YAG laser whose output was frequency tripled to produce approximately 10-ns-long laser pulses at 355 nm at a repetition rate of 30 Hz. The transmitted laser beam was made coaxial with the center of the field of view of a 30-cm Cassegrain telescope. A fraction of the light received by the telescope (approximately 1.5%) was transmitted to a photomultiplier tube (PMT) which produced a photocurrent proportional to the light received. A narrow bandpass filter in front of the PMT blocked background radiation, including solar radiation, while allowing the elastically scattered laser light to be passed. The output of the PMT was signal-conditioned and sent to a digitizer which then recorded the received light intensity as a function of time. The electrical bandwidth of the PMT and signal conditioning was approximately 100 MHz. The digitizer rate was also 100 MHz, yielding a range resolution of approximately 1.5 m. The far-field angular divergence of the transmitted laser beam was approximately 500 microradians (full angle) and the field of view of the PMT was approximately 850 microradians to accommodate small shot-to-shot pointing jitter in the laser. The laser was operated at about 30 mJ/pulse at 355 nm. The laser transmitter and the PMT detector optics were rigidly attached to the receiver telescope. The entire coaxial lidar system was mounted in a 2-axis gimbal to allow the LIDAR beam to be pointed in a fixed direction or scanned in a plane.

An embodiment of this invention can use a staring (imaging) LIDAR system for tracking mobile agents; it consists of a pulsed laser transmitter and an intensified CCD (ICCD) receiver system. In one embodiment of this invention, the mobile agents can either have a natural fluorescent (or phosphorescent) signature or can be tagged with a fluorescent (or phosphorescent) dye. The laser wavelength is chosen to excite the natural fluorophore or taggant fluorescence. For many common dyes, a frequency tripled Q-switched Nd:YAG laser operating at 355 nm is appropriate. An embodiment of a staring LIDAR system designed for stand-off range of between 30 and 50 meters can have an imaged area approximately 10 m by 10 m. The transmitted laser beam can be expanded to illuminate the entire imaged area. A receiver telescope with aperture between 7" diameter and 10" diameter can be coupled to an ICCD array detector. An optical bandpass filter with a bandpass of approximately 20 nm can be placed in front of the ICCD to block unwanted background light while passing the fluorescent signal from the taggant on the mobile agents. The laser transmitter and ICCD receiver optics can be rigidly coupled together and mounted as a unit on a gimbal or tripod so that the LIDAR can be pointed at the desired field to be measured. The gimbal or tripod also facilitates discrete re-positioning of the pointing to acquire data on fields of interest larger than the single-image field of view of the imaging LIDAR. Timing electronics synchronize the ICCD gate activation with respect to the laser pulse. When the gate of the ICCD is active, the ICCD is light sensitive; otherwise it is not. The ICCD gate is activated either simultaneously with the laser pulse emission or slightly after laser emission depending on the fluorescent lifetime of the taggant or natural fluorophore. The gate can remain active for several fluorescence lifetimes to ensure optimal signal collection, but can be turned off at all other times to reduce the background signal due to solar and other light sources.

The ICCD camera readout and laser repetition rate can be 30 Hz and the laser energy can be of the order of 30 mJ to 50 mJ per pulse. The images from the ICCD camera can be read out by standard commercial electronics supplied with the camera and the images can be processed on a computer using either commercial or custom software.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for mapping the movement and position of a mobile agent using stand-off optical detection comprising:
   transmitting a pulse of light at a first known time;
   interacting said pulse of transmitted light with a mobile agent to generate a pulse of interacted light;
   receiving said pulse of interacted light with a receiver optical system at an at least one later known time;
   measuring an intensity of said pulse of interacted light with at least one photodetection system in a manner suitable for electronic data storage;
   measuring a time interval between the transmitting of said pulse of transmitted light and the receiving of said pulse of interacted light;
   storing measurements of said intensity and said time interval between the transmitting and the receiving as data;
   repeating said interacting, receiving, measuring, and storing steps a plurality of times; and
   comparing said data by means of at least one change detection algorithm to map a location of said mobile agent in time and space.

2. The method of claim 1 wherein the receiving step is performed using a receiver optical system comprising a receiver telescope and at least one optical band-pass filter suitable for passing light that has interacted with the mobile agent and wherein the at least one photodetection system comprises at least one photodetector with gain and at least one digitizer to record the intensity of the pulse of interacted light.

3. The method of claim 1 wherein the receiving step is performed using a receiver optical system comprising a means for recording an image of an area illuminated by the pulse of transmitted light.

4. The method of claim 3 wherein said means for recording an image comprises a gated camera and lens system.

5. The method of claim 1 wherein the mobile agent is a living organism.

6. The method of claim 5 wherein the mobile agent is a member of one of the taxonomic classes of insecta, crustacea, arachnids, osteichthyes, chondrichthyes, aves, and mammalia.

7. The method of claim 6 wherein the mobile agent is a member of the taxonomic order of *hymenoptera*.

8. The method of claim 1 wherein the mobile agent is non-living.

9. The method of claim 1 wherein the pulse of interacted light is light elastically scattered from the mobile agent.

10. The method of claim 9 wherein a wavelength of the pulse of transmitted light is selected to minimize scattering from an aerosol or a gas molecule while maximizing a scattering reflectance from a mobile agent.

11. The method of claim 1 wherein the mobile agent emits the pulse of interacted light at a wavelength different from a wavelength of the pulse of transmitted light.

12. The method of claim 1 wherein a material adherent to the mobile agent emits said interacted light at a wavelength different from a wavelength of said pulse of transmitted light.

13. The method of claim 1 wherein said pulse of transmitted light comprises a collimated light beam and wherein said collimated light beam is translated laterally between a plurality of pulses to scan an area.

14. The method of claim 13 wherein said intensity of said pulse of interacted light is measured as a function of time since said known time of transmitting the transmitted pulse of light, thereby generating a time-and-intensity profile, and a distance to said mobile agent is calculated using said time-and-intensity profile.

15. The method of claim 14 wherein a plurality of said time-and-intensity profiles are compared using a change-detection algorithm to generate a multi-dimensional mapping of the location of said mobile agent.

16. The method of claim 1 wherein said pulse of transmitted light comprises an uncollimated light beam illuminating an area wherein a location of said mobile agent is to be determined.

17. The method of claim 16 wherein said pulse of interacted light is received by a means for recording an image to generate a 2-dimensional image of said intensity of said interacted light at a plurality of times later than said pulse of transmitted light.

18. The method of claim 17 wherein said means for generating an image is selected from the group consisting of a CCD array, an intensified CCD array, a CID array, and an IR focal plane array.

19. The method of claim 17 wherein said intensity of said pulse of interacted light is measured as a function of time since said known time of transmitting the transmitted pulse of light, thereby generating a time-and-intensity profile, and a distance to said mobile agent is calculated using said time-and-intensity profile.

20. The method of claim 19 wherein a plurality of said time-and-intensity profiles are compared using a change-detection algorithm to generate a multi-dimensional mapping of the location of said mobile agent.

* * * * *